INFLUENCE OF MOISTURE & pH ON BREAKING OF OIL PHASE EMULSION

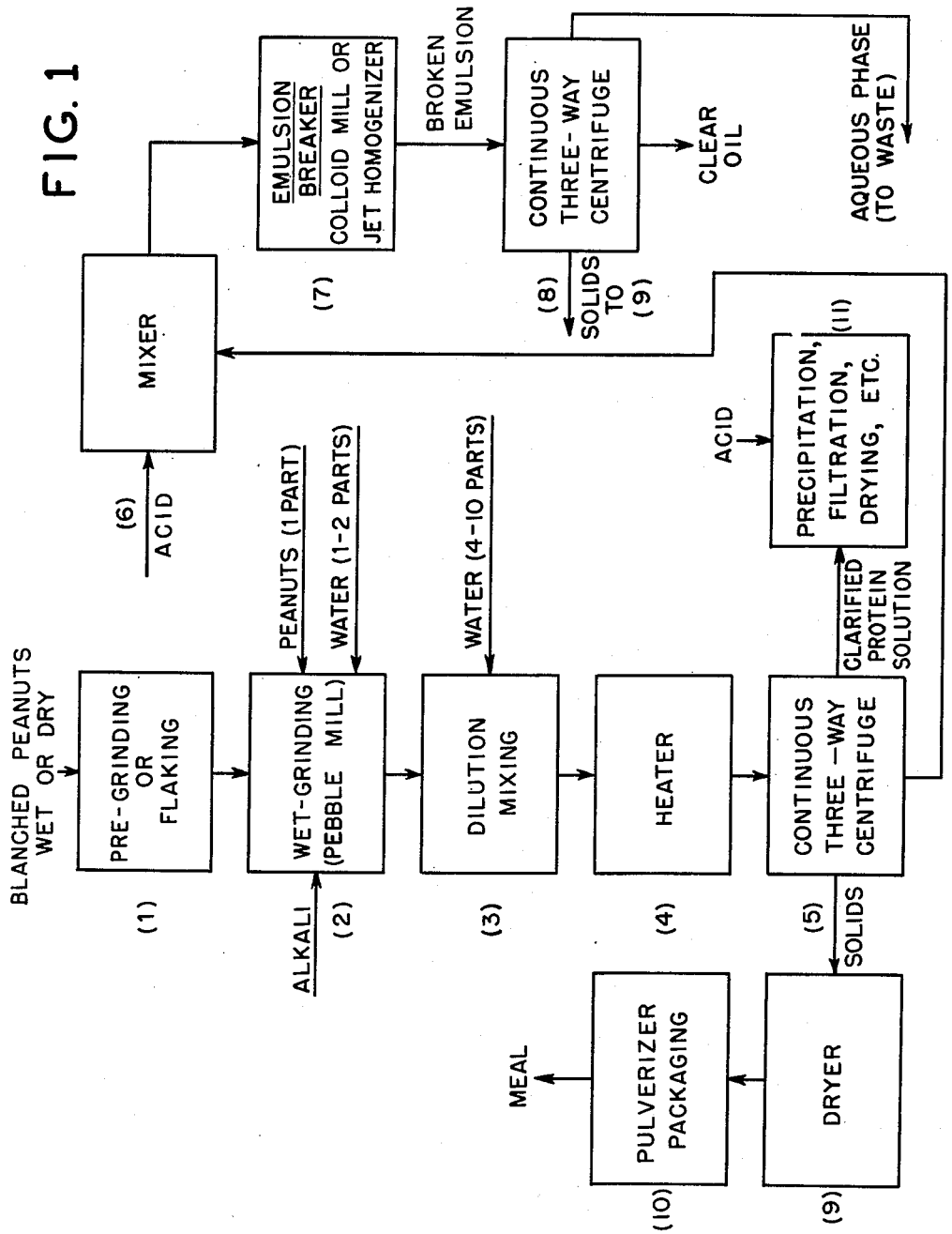

INFLUENCE OF pH OF SOLUTION ON SOLUBILITY OF PROTEIN

——— PEANUT
---- SOYBEAN
—··— COTTONSEED
········ TUNG NUT

*INVENTOR.*
NATHAN SUGARMAN

FIG. 4
TUNG OIL
FIG. 5
COTTONSEED OIL
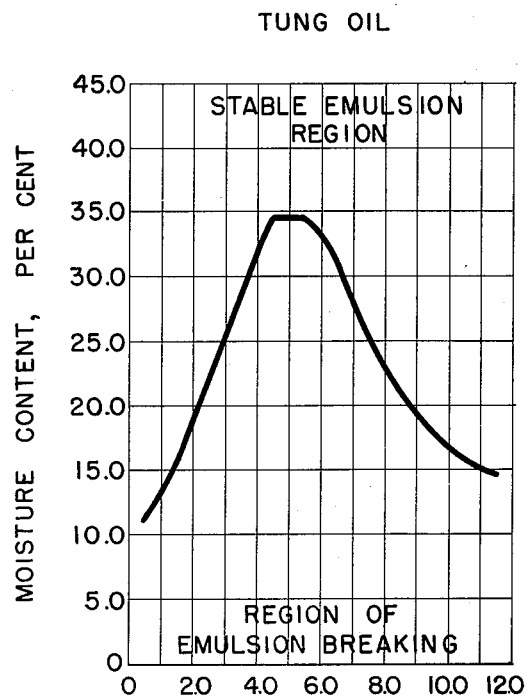
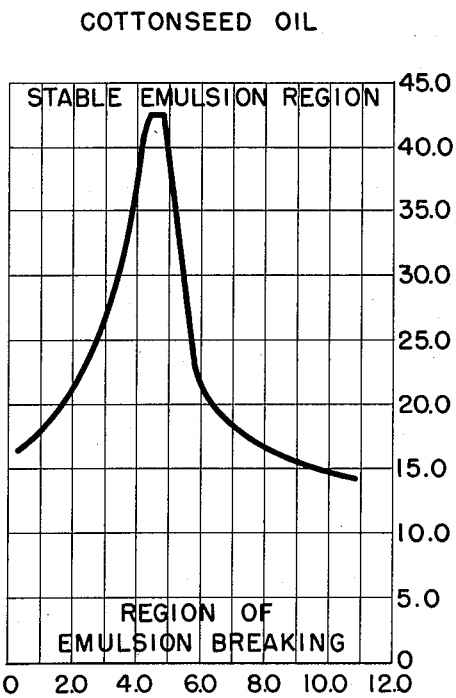
pH
INFLUENCE OF MOISTURE AND pH
ON
BREAKING OF OIL PHASE EMULSION United States Patent Office 2,762,820
Patented Sept. 11, 1956

2,762,820

PROCESS FOR SIMULTANEOUSLY EXTRACTING OIL AND PROTEIN FROM OLEAGINOUS MATERIALS

Nathan Sugarman, Atlanta, Ga., assignor to Georgia Tech Research Institute, Atlanta, Ga., a corporation of Georgia Application September 29, 1950, Serial No. 187,473

18 Claims. (Cl. 260—412.3)

This invention relates to a process for extracting oil and protein from oleaginous materials, and more particularly it is a process for extracting and separating the protein and oils from oil seeds and oleaginous substances whereby the oil derived therefrom is in substantially a pure form, and the protein is relatively undenatured.

It is often desirable to obtain oil from peanuts, soy beans, tung nuts, cottonseed, and the like, and to obtain this oil in substantially its pure form for many varied uses. It is also often desirable to separate from the residue proteins which may find many useful applications; in previous processes, however, this protein separation has had to be a separate and distinct operation.

In the past, various methods have been used to obtain oil from these oleaginous substances by use of heat, pressure, or solvents; but these processes have not been completely satisfactory for several reasons. For example, when heat is used in the extraction, certain undesirable alterations occur in the products. Also, the expense of solvent extraction is sometimes high, and the fire hazard involved in using inflammable solvent is great; therefore, this process is not too desirable. In mechanical extraction, such as pressing, the yield of oil is comparatively low, and therefore pressing does not utilize to the fullest extent the oil within the seed. In addition, heating of the residues to high temperature during processing results in partial denaturation of the protein, thereby decreasing the yields and quality of the protein which may be extracted from such residues.

Accordingly, it is an object of the invention to provide a process for extracting oils and proteins from oleaginous substances, which is economical in operation and which will produce a high yield of substantially pure oil.

Another object of the invention is to provide a process for extracting substantially undenatured protein from oleaginous substances.

Another object of the invention is to provide a process for extracting oils and proteins from oleaginous substances which will separate that substance into oil, proteins, and solid residue.

Another object of the invention is to provide a process embodying the above objects, which process may easily be controlled to give a substantially uniform oil as an end product.

A further object of the invention is to provide a process for extracting oil from oleaginous substances which is efficient, economical to operate, and easy to control, and which will provide an oil therefrom substantially free from water and emulsifying agents.

Other and further objects and advantages of my invention will become apparent from the following description taken in conjunction with the accompanying drawings, wherein:

Fig. 1 is a flow diagram illustrating the various steps of a process in accordance with my invention.

Fig. 4 illustrates the influence of moisture and pH on breaking of tung oil emulsion.

Fig. 5 illustrates the influence of moisture and pH on breaking of cottonseed oil emulsion.

Briefly, my process consists of grinding oil seeds to a slurry in an alkaline solution of a pH such that optimum solubility of protein is attained, diluting the slurry to proper consistency, and separating the solids, concentrated oil emulsion, and clarified protein solution by means of a centrifugal separation machine. The concentrated oil emulsion is broken by adjusting the pH to a value depending upon the moisture content and subjecting it to vigorous mechanical action exerting strong shear and pressure forces, thus causing internal stress within the emulsion. Recovery of the substantially pure oil is accomplished by centrifuging after the emulsion is broken. The solid materials obtained from the first-mentioned centrifuging process are dried, pulverized, and packaged as a meal. The clarified protein solutions are treated with acid to precipitate the protein, which is then filtered, washed, and dried.

In more detail, and using peanuts as one example, I have provided that the steps as shown in Fig. 1 be taken. It will be understood that my process is equally applicable to other oleaginous substances, as seen in Figs. 4 and 5, and I do not wish to limit this invention to the specific nuts and seeds disclosed or discussed.

First, the shelled peanuts are reduced in size in a grinding or flaking mill. In this step the material is reduced to the consistency of peanut butter. The material is next transported to a pebble mill where one to two parts of water are introduced to each part of ground peanuts, to give the optimum grinding consistency. To the grinding slurry is added a sufficient quantity of alkali to bring the pH of the slurry within a range to be determined by the graphs in Fig. 2, and more specifically described hereinafter. The alkali may be in the form of sodium hydroxide, sodium carbonate, or lime, or any suitable alkali. The material is ground in the pebble mill for a period of one to three hours.

After grinding the slurry for the required length of time to obtain sufficient break-down of the material and release and dispersion of the oil into the protein solution, the slurry is diluted with a quantity of water which may vary from 4 to 10 parts or more. The diluted slurry is agitated for a time to allow the protein material to be essentially dissolved or dispersed.

Figure 2:
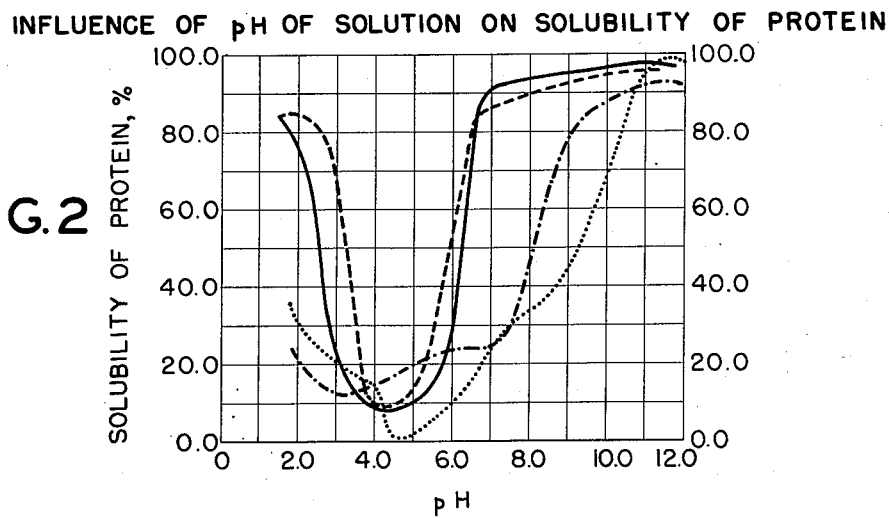
Fig. 2 is a graph illustrating the influence of pH on the solubility of protein in various oleaginous substances.

In the prior art, recognition was made that an alkaline solution should be used as a grinding medium for oleaginous materials, but no distinction was made between the various oilseeds as to what pH values should be used, nor is there found there any recognition of the effect or any suggestion of the necessity for controlling pH. Fig. 2 illustrates graphically the solubility of different proteins at given pH values of their solutions; from the curves therein it is apparent that, generally speaking, high pH values should be used to dissolve the maximum proteins. Strong alkalis, however, cause saponification of the oils, which is undesirable, and therefore as low a pH value as possible should be used, thus narrowing the range of pH values which are feasible to employ.

The purpose of using alkaline solutions in the first place is to dissolve and carry into solution or dispersion the protein material contained in the oilseed. It is desirable, for the sake of obtaining high efficiency of oil recovery, to dissolve as much of the protein as possible, because dissolving away this protein material assists in the release of oil into water dispersion. In addition, the amount of residual solids which carry oil out as a loss is decreased by maximum solution of the proteins.

From Fig. 2, it is evident that in order to obtain maximum solubility of the protein, the conditions of pH during the process must be controlled according to the characteristics of each individual oilseed. Because of the undesirability of saponification, as low a pH value as is possible should be maintained which will nevertheless give high solubilities of protein.

Peanuts, the example used throughout this specification, would require a pH value of between pH 7.5 and pH 10.0. It is to be remembered, however, that pH values for only reasonably high solubility of protein need be employed in the grinding process and that if pH values for maximum solubility were effected immediately after dilution additional protein would be dissolved.

Although the solubility of the protein is greater at higher pH values, I have found it desirable to change the pH of the diluted slurry to as low a value as practical without precipitating protein, immediately before centrifuging. It will be understood by those skilled in the art that the stability of an oil-in-water emulsion is decreased when the interfacial tension between the two phases is increased. I have found that the interfacial tension between peanut oil and protein solution is increased by lowering the pH of the protein solution.

Therefore, considering the above factors, at this point it is desirable to have a pH range between 7.5 and 7.75 for processing peanuts, to diminish the stability of the emulsion system and diminish saponification of the oil. If the pH of the diluted slurry is in the upper range, that is, between a pH of 8.0 to 10.0, the pH is lowered by adding acid until the range mentioned above is reached. It will be obvious to those skilled in the art that proper indicators used for each pH control need not be mentioned here.

Next, the diluted slurry, with pH adjusted, is heated rapidly to a temperature of from 25 to 80 degrees centigrade, such heating being desirable to render efficient the subsequent centrifuging; too high a temperature, however, would cause product damage. The heated slurry then is introduced into a three-way centrifuge, such as a De Laval multi-matic or nozzle-matic centrifuge, at such a rate that the discharge is divided into clarified protein solution, concentrated oil emulsion, and solid residue. It should be noted that prior art methods have described the process disclosed above without specific control of pH, and some have claimed to obtain pure oil from methods approximating the process thus far described. I have found, however, that concentrated oil emulsion, and not pure oil, is obtained when using commercial equipment for centrifuging, and my process for breaking of this oil emulsion will be described later. It should be remembered that three-way centrifuging is but one way of separating the three phases described, and that separation of these phases may also be accomplished by first separating the solids by centrifuging and then, in a second step, separating the concentrated oil emulsion from the protein solution in one or more stages of centrifuging. The oil emulsion at this stage is much the same in appearance and texture as a heavy dairy cream or mayonnaise.

The solid residue obtained from the centrifuging process may be dried and pulverized for packing as a meal, and the clarified protein solution may be sent to a protein recovery system. The protein recovery process consists of precipitating the protein by adding acid to the protein solution and separating the precipitate by any convenient method such as centrifuging or filtration. After the precipitate is separated it may be washed to remove the entrained acid and packaged in a dried form. It is to be remembered that, while the solid residue which is separated from the protein solution and oil-water emulsion has released a great portion of its oil and protein, it may be desirable to reslurry this residue by introducing it into other alkaline solutions in order to recover further quantities of oil and protein. These solutions, after removal of the solids, may be used for diluting the slurry after the grinding steps without departing from the scope of my invention.

After leaving the centrifuge, the concentrated oil emulsion is placed in a mixing vat or vessel and sufficient hydrochloric acid or other suitable acid is introduced to adjust the pH to a value within the range at which the emulsion can be broken. A solution of sodium hydroxide may be used if it is desired to adjust the pH upwards.

I have discovered that the concentrated oil emulsion discharged by the centrifugal separator can be completely broken by the application of mechanical action resulting in shear and pressure forces, provided that proper relationships of moisture content and pH of the emulsion prevail.

Figure 3:
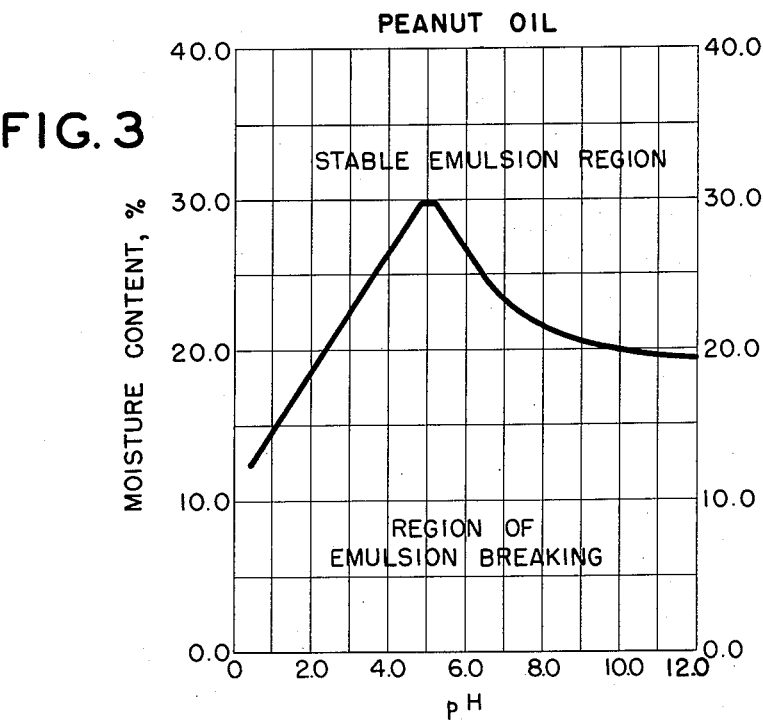
Fig. 3 illustrates the influence of moisture and pH on breaking of peanut oil emulsion.

As shown in Fig. 3 of the drawing, I have discovered that for peanut oil emulsions there is a critical value for the moisture content above which the emulsion cannot be broken. Looking at the graph in Fig. 3, it is apparent that the concentrated emulsion cannot be broken at any pH value where the moisture content is above approximately 29.7% water; and, I have further found that, at moisture contents slightly below this critical range, the pH range over which the concentrated emulsion may be broken is quite narrow. As an example, at 27.5% water the pH range at which the emulsion may be broken is approximately from pH 4.25 to pH 5.75.

I have also found that, as the moisture content of the concentrated oil emulsion is diminished, the range of pH over which the emulsion may be broken is widened. For example, at a moisture content of 22.7%, the pH range for breaking the emulsion widens to a range of between pH 2.95 to pH 6.60. Further reduction of moisture content will give a corresponding widening of the pH range as graphically shown in Fig. 3.

The results described above are for emulsions of peanut oils, and it should be obvious, from Figs. 4 and 5, that similar critical values exist for tung oil, cottonseed oil, and other oils. It is to be remembered that the graphs shown in Figs. 3, 4 and 5 are approximations, since slight deviations from the numerical values may be observed through use of different types of equipment, or may be caused by temperature variations.

The concentrated oil emulsion, which, it should be remembered, is of mayonnaise-like consistency, is now ready for the emulsion-breaking step. Before passing into the emulsion breaker, the temperature of the emulsion may be adjusted to a higher or lower degree depending upon the exact type of emulsion breaker used. While an increase in temperature will lower the viscosity of the oil emulsion and may decrease its stability, I have found that when using a Charlotte type colloid mill as the emulsion breaker it is desirable to have the emulsion at room temperature or lower. The operable temperature will depend to a great extent upon the operating characteristics of the particular emulsion breaker used.

The oil emulsion, with its pH adjusted to the proper value, is next passed into a jet type homogenizer, a colloid mill, or other type of machine capable of subjecting the material to high shear and pressure stresses. In the laboratory I have used a Waring Blendor for breaking small amounts of emulsion. For larger amounts, I have used a Charlotte colloid mill. The stresses thus generated are capable of breaking down the weakened film of protective colloid on the oil particles, thus allowing the oil to coalesce. The oil emulsion thus acted upon is now separated into a mixture of clear oil, aqueous phase, and suspended solids.

The mixture of the broken emulsion components is next introduced into a centrifuge, and substantially all of the clear oil may be separated from the residue. The oil thus obtained is of good color and quality and may be subjected to such subsequent refining and bleaching steps as may be necessary or desired. It may also be desired to filter the oil to remove such particles as were not removed by the centrifuge,

I claim:

1. Process for extracting oil and protein from oleaginous material comprising, comminuting said material, then grinding to a slurry in an aqueous alkaline solution of a pH such that substantially optimum solubility of protein is obtained, then lowering the pH without precipitating the protein, heating to a temperature of from 25° C. to 80° C., thereafter separating the material into concentrated oil emulsion, protein solution, and solids, treating the protein solution with acid to precipitate the protein, treating said concentrated oil emulsion to control the pH thereof according to the moisture content thereof so as to maintain the moisture pH relationship within the region of emulsion breaking, and then mechanically breaking said oil emulsion to recover the oil.

2. Process for extracting oil from oleaginous material comprising, comminuting said material, then grinding to a slurry in an aqueous alkaline solution of a pH such that approximately optimum solubility of protein is obtained, then lowering the pH without precipitating the protein, heating to a temperature of from 25° C. to 80° C., thereafter separating the material into concentrated oil emulsion, protein solution, and solids, treating said concentrated oil emulsion to control the pH thereof according to the moisture content thereof so as to maintain the moisture pH relationship within the region of emulsion breaking, and then mechanically breaking said oil emulsion to recover the oil.

3. Process for extracting oil from oleaginous material comprising, comminuting said material and grinding to a slurry in an aqueous alkaline solution of a pH such that approximately optimum solubility of protein is obtained, heating to a temperature of from 25° C. to 80° C., thereafter separating the material into concentrated oil emulsion, protein solution, and solids, regulating the pH of the oil emulsion according to the moisture content thereof so as to maintain the moisture-pH relationship within the region of emulsion breaking, and then mechanically breaking said oil emulsion to recover the oil.

4. Process for extracting oil and protein from oleaginous material comprising, comminuting said material and grinding to a slurry in an aqueous alkaline solution of a pH such that approximately optimum solubility of protein is obtained, heating to a temperature of from 25° C. to 80° C., thereafter separating the material into concentrated oil emulsion, protein solution, and solids, treating the protein solution with acid to precipitate the protein, regulating the pH of the oil emulsion according to the moisture content thereof so as to maintain the moisture-pH relationship within the region of emulsion breaking, and then mechanically breaking said oil emulsion to recover the oil.

5. A process as set forth in claim 1, wherein the oleaginous material treated comprises peanuts.

6. A process as set forth in claim 1, wherein the oleaginous material treated comprises peanuts, and grinding is effected in an aqueous alkaline solution having a pH range of 7.5 to 10 followed by adjustment of the pH to between pH 7.5 and pH 7.75.

7. A process as set forth in claim 1, wherein the oleaginous material treated comprises tung nuts.

8. A process as set forth in claim 1, wherein the oleaginous material treated comprises tung nuts, and the grinding is effected in an aqueous alkaline solution having a pH range of 7.5 to 12 followed by adjustment of the pH to a range of approximately pH 10 to pH 12.

9. A process as set forth in claim 1, wherein the oleaginous material treated comprises cotton seed.

10. A process as set forth in claim 1, wherein the oleaginous material treated comprises cotton seed, and grinding is effected in an aqueous alkaline solution having a pH range of pH 9 to pH 12 followed by adjustment of the pH value to between pH 9 and pH 11.

11. A process as set forth in claim 1, wherein the oleaginous material comprises soy beans.

12. A process as set forth in claim 3, wherein the oleaginous material treated comprises peanuts, and grinding is effected in an aqueous alkaline solution having a pH range of 7.5 to 10.

13. A process as set forth in claim 3, wherein the oleaginous material treated comprises peanuts.

14. A process as set forth in claim 3, wherein the oleaginous material treated comprises tung nuts.

15. A process as set forth in claim 3, wherein the oleaginous material treated comprises tung nuts, and the grinding is effected in an aqueous alkaline solution having a pH range of 7.5 to 12.

16. A process as set forth in claim 3, wherein the oleaginous material treated comprises cotton seed.

17. A process as set forth in claim 3, wherein the oleaginous material treated comprises cotton seed, and grinding is effected in an aqueous alkaline solution having a pH range of pH 9 to pH 12.

18. A process as set forth in claim 3, wherein the oleaginous material comprises soy beans.

References Cited in the file of this patent

UNITED STATES PATENTS

| | | |
|---|---|---|
| 1,094,430 | Epler | Apr. 28, 1914 |
| 2,325,327 | Lachle | July 27, 1943 |
| 2,325,328 | Lachle | July 27, 1943 |

OTHER REFERENCES

A. F. Bailey: "Cottonseed and Cottonseed Products," published by Interscience Publishers, Inc., New York, 1948, page 464.